UNITED STATES PATENT OFFICE.

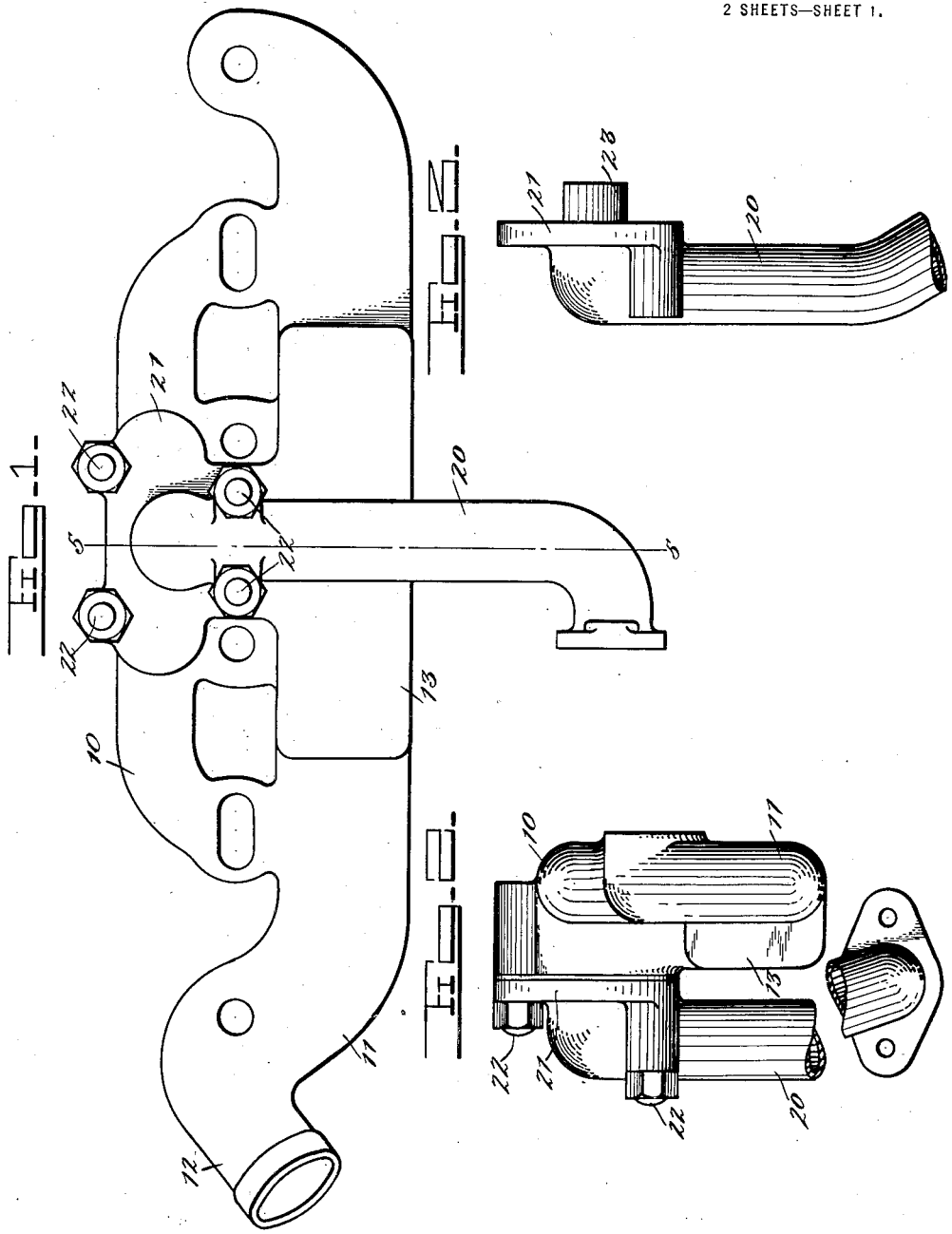

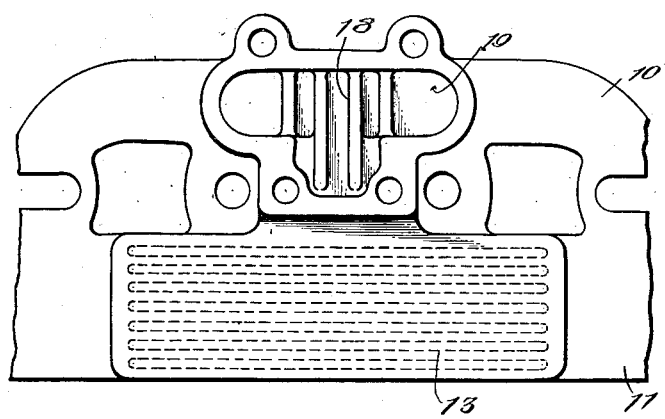
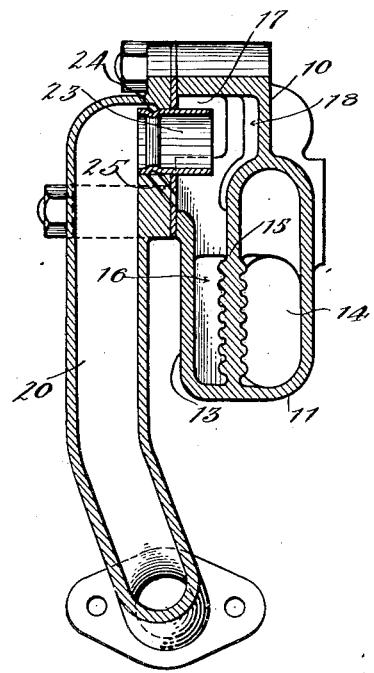

CARLISLE FORREST SMITH, OF KOKOMO, INDIANA.

CARBURETED-FUEL SEPARATOR AND FUEL-VAPORIZER.

1,394,948.  Specification of Letters Patent.  Patented Oct. 25, 1921.

Application filed November 20, 1919. Serial No. 339,382.

*To all whom it may concern:*

Be it known that I, CARLISLE FORREST SMITH, a citizen of the United States, and a resident of Kokomo, in the county of Howard and State of Indiana, have invented certain new and useful Improvements in Carbureted-Fuel Separators and Fuel-Vaporizers, of which the following is a specification.

My present invention relates generally to devices located between the carbureter and working cylinders of an internal combustion engine for treating the carbureted fuel supply, and is in particular a device for separating unbroken portions of liquid fuel from that portion of the fuel consisting of well broken particles suspended in and carried by the air, and my object is to increase the efficiency of internal combustion engines by so separating the fuel and subjecting the heavier particles of liquid alone to the vaporizing action of a heated surface.

More especially my invention contemplates the use of means in connection with an intake and exhaust manifold whereby to receive and separate fuel flowing from a carbureter to the extent of withdrawing heavier particles and unbroken portions of fluid from the well broken particles suspended in the air which pass on to the intake ports, the heavier particles of unbroken fluid so separated, falling upon a surface heated by the exhaust gases so as to vaporize the same in order that they may rise into and join with the flow of well broken fuel.

In the accompanying drawings which illustrate the referred form of construction conceived by my invention and which forms a part of this specification, Figure 1 is a front elevation of the device complete, Fig. 2 is an end view, Fig. 3 is a side view of the carbureted fuel pipe, Fig. 4 is a front elevation of the central portion of the apparatus with the fuel pipe removed, and Fig. 5 is a vertical transverse section taken centrally through the apparatus on line 5—5 of Fig. 1.

Referring now to these figures and particularly to Fig. 1, I have shown a combined intake and exhaust manifold, of which the upper portion 10 is the intake and the lower portion 11 the exhaust, the latter having a tubular extension 12 at one end for attachment to a muffler or a muffler pipe.

Adjacent to the central portion of the combined manifold is an enlargement, the front wall 13 of which is separated from the exhaust passage 14 as seen in Fig. 5, by means of a vertical wall 15 forming a vaporizing well 16 between this internal wall 15 and the front wall 13, this well being in communication at its upper portion with the inlet passage 17 of the manifold, and below a series of vertical ribs 18 disposed opposite to the intake opening 19, the latter of which receive carbureted fuel from a fuel supply pipe 20, leading in practise from a carbureter.

As shown in Fig. 5, the internal wall 15 is fluted or ribbed at its lower portion in order to withdraw maximum heat from the exhaust gas in the passage 11 and radiate maximum heat into the liquid within the vaporizing well 16 to which the liquid falls from the ribs 18. At opposite sides of the ribs 18 the intake opening 19 is in communication with the intake passage 17 of the manifold, as shown.

The flanged upper end 21 of the fuel feed pipe 20 is secured, by bolts 22 or any other suitable manner to the manifold around its intake opening 19 and carries in its end communicating with the manifold a short delivery tube 23 as best seen in Fig. 5, having at one end, within the pipe 20, an annular external groove 24 the purpose of which is to entrap any unvaporized fuel passing upwardly along the inner surface of the pipe. The pipe is also provided with a downwardly and inwardly inclined opening 25 whose upper end communicates with the groove 24 and whose lower end communicates with the upper portion of the vaporizing well 16 so that the liquid entrapped within the groove 24 will fall into the vaporizing well.

It is thus obvious that carbureted fuel passing through the pipe 20 to the manifold will strike the ribbed wall 18 of the manifold opposite its intake opening, as will be plainly seen by a comparison of Figs. 4 and 5, that portion of the fuel which contains well broken particles of fluid suspended in the air being free to pass to opposite sides of the ribbed wall and thus into the intake passage 17 of the manifold.

It will be observed, however, that such particles of fluid as are not sufficiently broken to be carried by the air after impingement against the ribbed wall 18, will travel down the same and fall into the vaporizing well 16 and thus against or in close proximity to the exhaust heated wall 15.

The fluid so falling is vaporized by the heat from the wall and the vapors rise out of the well and comingle with the well broken fuel passing directly into the intake passage 17 as above described.

In this way, my invention proposes an arrangement wherein the properly broken up particles of fuel are free to pass into the working cylinders along with the air, this being the ideal condition of the fuel from the standpoint of economy and efficiency. Only those portions of the fuel, namely, the heavier improperly broken particles of fuel are acted upon and vaporized, which if passed directly into the working cylinders would set up an uneconomical and inefficient result, and my invention thus avoids the disadvantages of known fuel feeding apparatus without sacrificing any of the advantages thereof which are commonly incident thereto.

I claim:—

1. A manifold having an intake opening, a baffle opposite the intake opening, means forming a vaporizing well below and into which the baffle drains, provided with an exhaust heated wall, a fuel feed pipe attached to the manifold and a fuel intake tube extending from the adjacent end of the pipe and projecting into the intake opening of the manifold toward and at right angles to the said baffle.

2. A manifold having an intake opening, a vertical baffle opposite the intake opening, means forming a vaporizing well below and into which the baffle drains, provided with an exhaust heated wall, a fuel feed pipe attached to the manifold and a fuel intake tube extending from the adjacent end of the pipe and projecting into the intake opening of the manifold toward and at right angles to the said baffle, said tube having an external annular groove within the fuel pipe, and said fuel pipe being provided with a passage in communication between the lower portion of the said groove and the upper portion of the said vaporizing well.

3. A manifold having intake and exhaust passages, and an intake opening leading horizontally into the intake passage at right angles thereto, said manifold having a vertical wall provided with vertical ribs opposite the intake opening to form a baffle, means forming a vaporizing well along a portion of the exhaust passage, opening upwardly beneath the baffle and into which the latter drains, said vaporizing well being separated from the exhaust passage, and in communication with the intake opening, and the intake passage, as described.

4. A manifold having intake and exhaust passages, an intake opening leading horizontally into the intake passage at right angles thereto, said manifold having a wall provided with vertical ribs opposite the intake opening to form a baffle, means forming a vaporizing well along a portion of the exhaust passage, opening upwardly beneath the baffle and into which the latter drains, said vaporizing well being in communication at its upper portion with the intake opening and the intake passage, and said manifold including a fluted wall between the exhaust passage and the vaporizing well, as described.

CARLISLE FORREST SMITH.